US012490888B2

(12) United States Patent
Buch et al.

(10) Patent No.: US 12,490,888 B2
(45) Date of Patent: Dec. 9, 2025

(54) ENDOSCOPE HANDLE WITH FRAME

(71) Applicant: AMBU A/S, Ballerup (DK)

(72) Inventors: Ken Henrik Buch, Vordingbord (DK);
Peter Bender Christoffersen, Kgs. Lyngby (DK); Jonas Hjortlund, Copenhagen S (DK); Charlotte Krag Varslev-Pedersen, Ballerup (DK)

(73) Assignee: AMBU A/S, Ballerup (DK)

( * ) Notice: Subject to any disclaimer, the term of this patent is extended or adjusted under 35 U.S.C. 154(b) by 282 days.

(21) Appl. No.: 18/072,383

(22) Filed: Nov. 30, 2022

(65) Prior Publication Data
US 2023/0165441 A1    Jun. 1, 2023

(30) Foreign Application Priority Data

Dec. 1, 2021 (EP) ..................... 21211783

(51) Int. Cl.
*A61B 1/005* (2006.01)
*A61B 1/00* (2006.01)
*A61B 1/05* (2006.01)

(52) U.S. Cl.
CPC ........ *A61B 1/0052* (2013.01); *A61B 1/00045* (2013.01); *A61B 1/00119* (2013.01);
(Continued)

(58) Field of Classification Search
CPC .............. A61B 1/0052; A61B 1/00045; A61B 1/00119; A61B 1/00128; A61B 1/015;
(Continued)

(56) References Cited

U.S. PATENT DOCUMENTS 3,734,084 A  *  5/1973  Ousterhout ............ A61B 13/00
                                                           600/243
4,552,129 A     11/1985  Utsugi et al.
(Continued)

FOREIGN PATENT DOCUMENTS

DE          3206381 A1      9/1983
DE          4000410 A1      7/1991
(Continued)

OTHER PUBLICATIONS

Extended search report in European Patent Application No. 21211783. 2, dated May 10, 2022, 8 pages.
(Continued)

*Primary Examiner* — Anh T Nguyen
*Assistant Examiner* — Jae Woo
(74) *Attorney, Agent, or Firm* — Faegre Drinker Biddle & Reath LLP

(57) ABSTRACT

An endoscope having a handle including a frame, a fluid handling device secured to the frame via an interface, the fluid handling device comprising a fluid passage having a first fluid opening, a tube in fluid communication with the fluid opening of the fluid handling device, and shell parts enclosing a cavity accommodating the frame, the tube, and at least partly the fluid handling device therein, wherein, at least prior to enclosing the frame, the tube, and at least partly the fluid handling device within the cavity of the shell parts, the interface and the tube are configured to permit movement of the fluid handling device relative to the frame within a pre-determined boundary comprising a first position and a second position separated by a distance.

20 Claims, 7 Drawing Sheets

(52) U.S. Cl.
CPC ........ *A61B 1/00128* (2013.01); *A61B 1/0057* (2013.01); *A61B 1/05* (2013.01); *A61B 1/00057* (2013.01); *A61B 1/0011* (2013.01)

(58) Field of Classification Search
CPC .............. A61B 1/00066; A61B 5/6865; A61B 17/3423; A61B 17/3462
See application file for complete search history.

(56) References Cited

U.S. PATENT DOCUMENTS

| | | | | |
|---|---|---|---|---|
| 4,685,463 | A * | 8/1987 | Williams | ............... A61B 5/686 600/549 |
| 5,169,568 | A | 12/1992 | Ainger, III | |
| 5,347,993 | A | 9/1994 | Tanaka | |
| 5,377,668 | A * | 1/1995 | Ehmsen | ............. A61B 1/00195 600/162 |
| 6,527,707 | B1 | 3/2003 | Frische et al. | |
| 9,622,646 | B2 * | 4/2017 | Ouyang | ............. A61B 1/00098 |
| 10,335,020 | B2 | 7/2019 | Oskin | |
| 10,624,617 | B2 | 4/2020 | Matthison-Hansen et al. | |
| 10,631,716 | B2 | 4/2020 | Matthison-Hansen | |
| 10,645,260 | B2 | 5/2020 | Matthison-Hansen et al. | |
| 10,688,284 | B2 * | 6/2020 | Hill | ................... A61M 25/0133 |
| 10,758,647 | B2 * | 9/2020 | Tobien | ...................... F16K 3/24 |
| 10,905,497 | B2 * | 2/2021 | Pandey | ................... A61B 5/055 |
| 11,103,131 | B2 * | 8/2021 | Majima | ................... A61B 1/015 |
| 11,622,674 | B2 | 4/2023 | Jensen | |
| 11,678,793 | B2 | 6/2023 | Hansen et al. | |
| 11,992,181 | B2 | 5/2024 | Qvist et al. | |
| 2004/0073084 | A1 * | 4/2004 | Maeda | ............... A61B 1/00042 600/101 |
| 2006/0276690 | A1 * | 12/2006 | Farris, III | .......... A61B 1/00105 600/162 |
| 2014/0155696 | A1 * | 6/2014 | Sakata | ............... A61B 1/00114 600/138 |
| 2014/0265313 | A1 * | 9/2014 | Durr | .................... A61B 1/0014 285/305 |
| 2015/0150632 | A1 * | 6/2015 | Kappel | .................. A61B 50/20 600/102 |
| 2016/0367112 | A1 | 12/2016 | Koyama | |
| 2017/0065152 | A1 * | 3/2017 | Koyama | .............. A61B 1/0052 |
| 2018/0153381 | A1 | 6/2018 | Wei et al. | |
| 2018/0296068 | A1 | 10/2018 | Matthison-Hansen et al. | |
| 2018/0303317 | A1 | 10/2018 | Matthison-Hansen | |
| 2019/0350440 | A1 | 11/2019 | Leong et al. | |
| 2020/0054194 | A1 | 2/2020 | Melsheimer | |
| 2020/0121304 | A1 * | 4/2020 | Johnsen | ............. A61B 1/00128 |
| 2020/0196843 | A1 | 6/2020 | Tah et al. | |
| 2020/0197579 | A1 * | 6/2020 | Chu | .................... A61B 1/00087 |
| 2020/0221929 | A1 * | 7/2020 | Harada | .............. A61B 1/00002 |
| 2020/0337529 | A1 | 10/2020 | Chu et al. | |
| 2021/0030258 | A1 * | 2/2021 | Oskin | .................... A61B 1/307 |
| 2021/0068625 | A1 * | 3/2021 | Shin | ..................... A61B 1/0057 |
| 2021/0137355 | A1 | 5/2021 | Lund et al. | |
| 2021/0203813 | A1 | 7/2021 | Matthison-Hansen et al. | |
| 2021/0298571 | A1 * | 9/2021 | Comee | ..................... A61B 1/12 |
| 2022/0378279 | A1 * | 12/2022 | Poll | ..................... A61B 1/00179 |
| 2023/0010903 | A1 * | 1/2023 | Jen | ........................ A61B 1/015 |
| 2023/0085800 | A1 | 3/2023 | Buch et al. | |
| 2023/0165442 | A1 | 6/2023 | Buch et al. | |
| 2023/0165444 | A1 | 6/2023 | Schütz et al. | |
| 2023/0233063 | A1 | 7/2023 | Matthison-Hansen et al. | |
| 2023/0397799 | A1 * | 12/2023 | Nguyen | ................ A61B 1/125 |
| 2024/0049945 | A1 * | 2/2024 | Harris | ..................... A61B 1/015 |
| 2024/0065533 | A1 * | 2/2024 | Sharp | ................. A61B 1/00128 |
| 2024/0081625 | A1 * | 3/2024 | Nguyen | ............. A61B 1/00119 |

FOREIGN PATENT DOCUMENTS

| | | |
|---|---|---|
| WO | 2020123588 A1 | 6/2020 |
| WO | 2021213598 A1 | 10/2021 |

OTHER PUBLICATIONS

Extended search report in European Patent Application No. 21211782.4, dated May 10, 2022, 8 pages.

\* cited by examiner

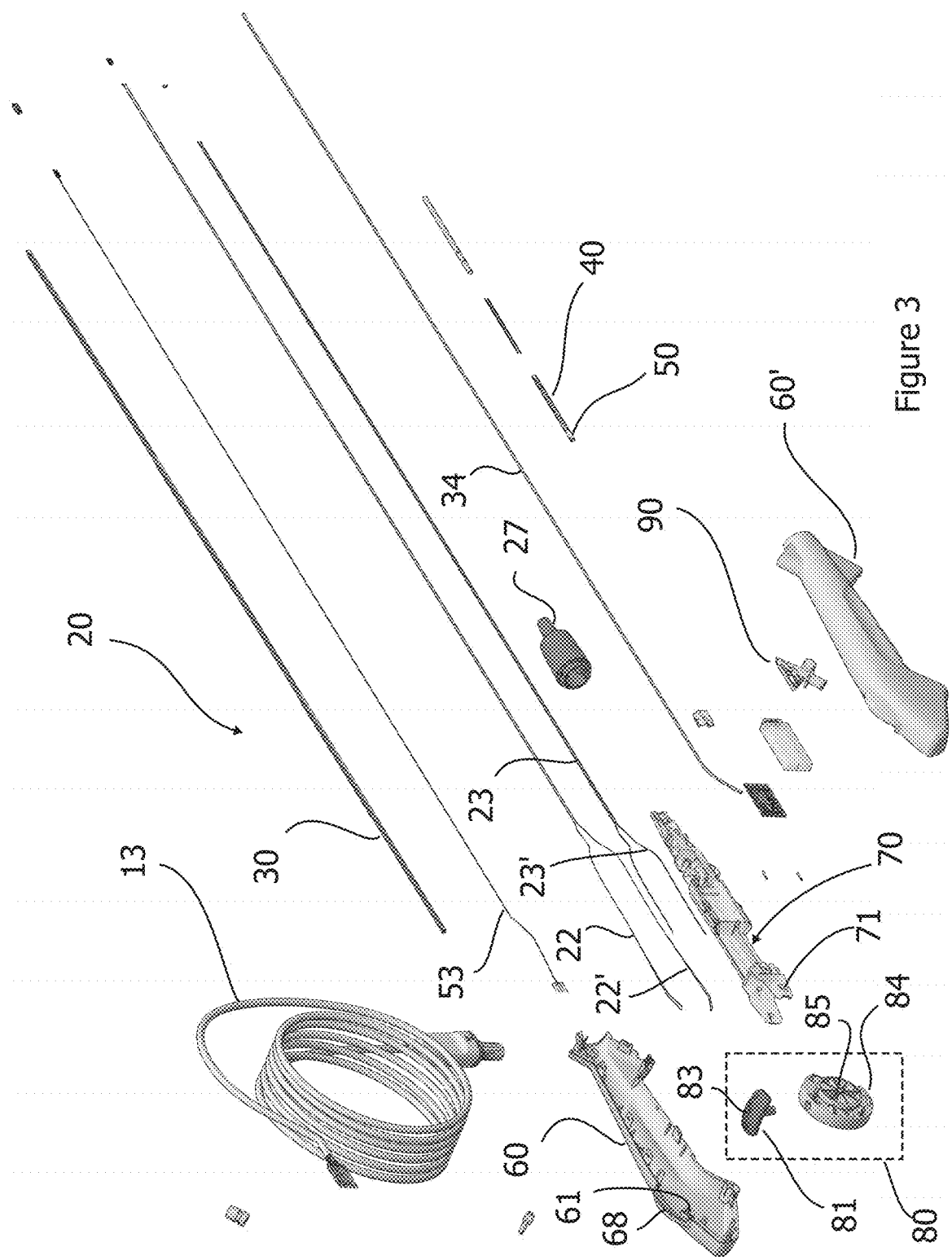

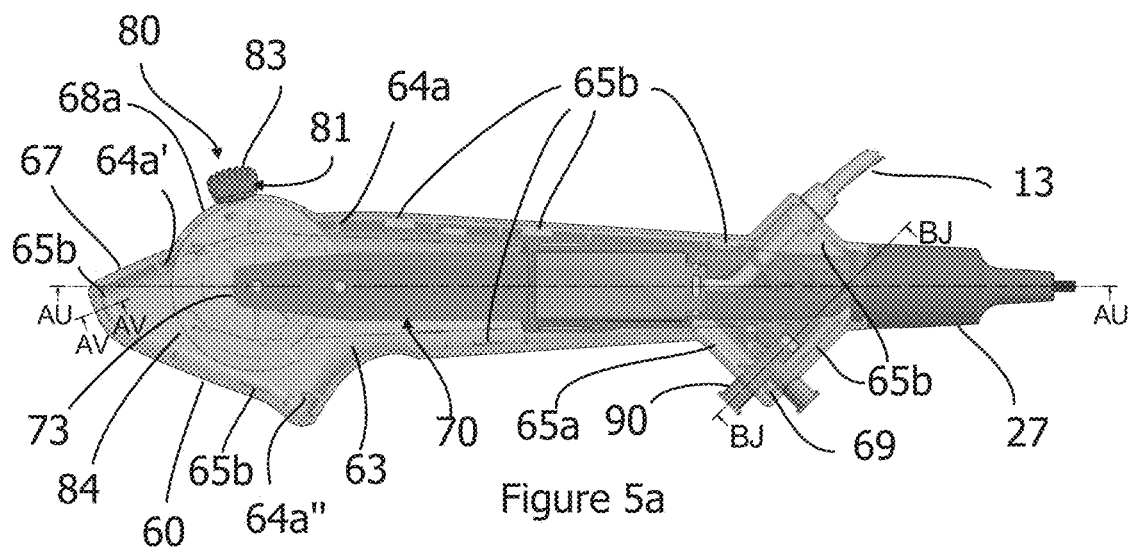
Figure 5a
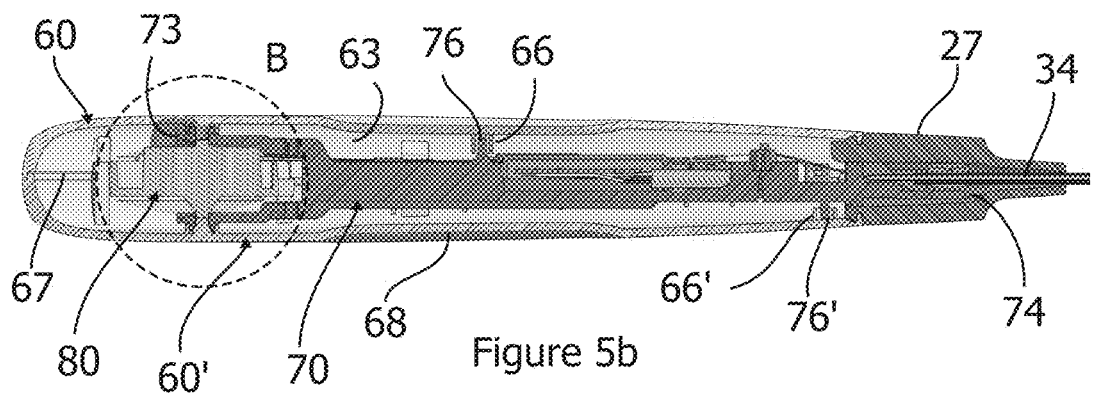
Figure 5b
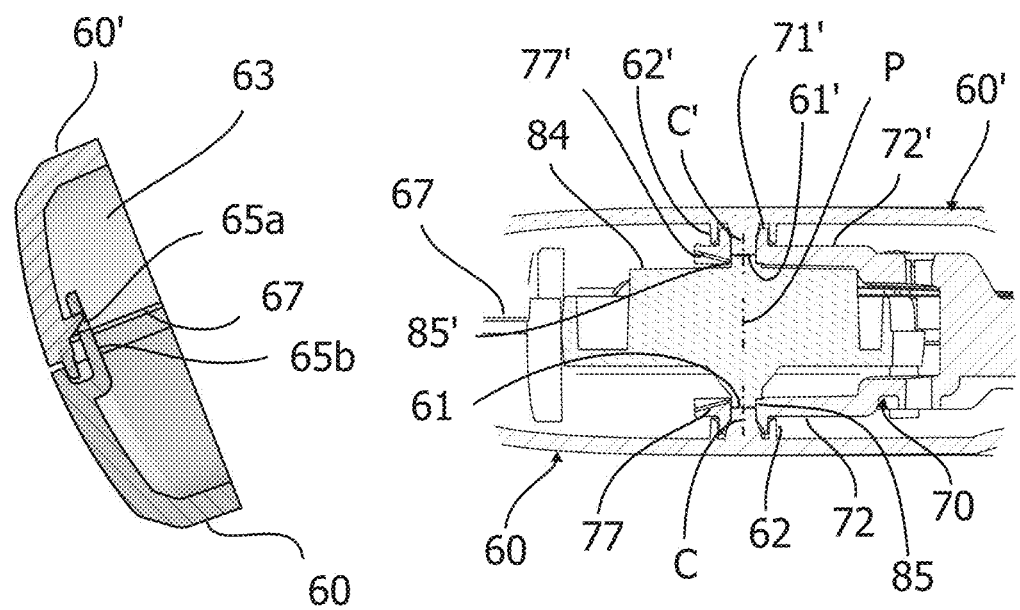
Figure 5c
Figure 5d

ENDOSCOPE HANDLE WITH FRAME

CROSS-REFERENCE TO RELATED APPLICATIONS

This application claims priority from and the benefit of European Patent Application No. EP 2121 1783, filed Dec. 1, 2021, said application incorporated by reference herein in its entirety.

TECHNICAL FIELD

The present disclosure relates to an endoscope handle comprising frame and a fluid handling device

BACKGROUND

Insertion endoscopes are well-known devices in the medical field for visually examining the interior of a hollow organ or cavity of a body, such as lungs or a bladder or intestines, by means of inserting an insertion cord of the endoscope. The insertion cord of the endoscope comprises an elongated insertion tube, a distal tip part, and a bending section connecting the insertion tube with the distal tip part. The endoscope typically has a handle connected to the insertion tube and positioned at the proximal end as seen from the operator. The endoscope further has a vision device, such as a built-in camera or fibre optics. The vision device is typically incorporated in the distal tip part at the distal end of the endoscope. This definition of proximal as being closest to an operator and distal as being furthest from an operator is used throughout this disclosure. Illumination of the area in front of the distal tip part of the endoscope is normally required, in particular the field of vision of the vision device. One known way of achieving such illumination is to incorporate one or more Light-Emitting Diodes (LEDs) in the distal tip part of the endoscope. Alternatively, illumination may be provided by light guides and/or fibre optics for guiding light from a light source outside the endoscope and to the distal tip part.

The bending section is provided in order to manoeuvre the endoscope inside the body cavity. The bending section has increased flexibility, e.g. achieved by a number of articulated segments of which the distal tip part forms the distalmost segment. Bending or straightening of the bending section in the insertion part of the endoscope is typically done by tensioning or slacking, respectively, steering wires running from the distal tip part through the remainder of articulated segments and along the inside of the elongated insertion tube to a control device, such as a control lever, of the endoscope handle.

Data and/or power cables for the vision device (when comprising a camera or image sensor) and other electronics, such as LED lighting accommodated in the distal tip part, also run along the inside of the elongated insertion tube and the bending section from the endoscope handle to the distal tip part. Furthermore, a working channel may run along the inside of the insertion tube and the bending section from the handle to the distal tip part, e.g. allowing liquid and/or gas to be removed from the body cavity or allowing the insertion of medical tools or surgical instruments into the body cavity. The working channel typically comprises a fluid fitting positioned at the handle and providing access therethrough to a working channel tube extending to an opening in the distal tip of the endoscope.

Once the functional components of the endoscope handle, e.g. the control device, steering wires, and the fluid fitting, are enclosed within shell parts of the endoscope handle, it may be difficult to adequately inspect, test, and validate the functions of the endoscope handle. If defects are discovered, then it may be difficult or even impossible to remedy these defects and can therefore result in the entire endoscope handle or even the entire endoscope being discarded. Therefore, there is a need to allow inspection, testing and validation of the functions of the endoscope handle prior to full assembly of the endoscope handle or endoscope. It goes without saying that the performance of the functional components should largely be unaffected by the subsequent assembly of the functional components within the shell parts.

However, in practice all dimensions of the components of the endoscope handle are subject to tolerances, which, due to cost, are desirably as loose as possible without affecting the function of the endoscope. Therefore, it is desirable that even the most extreme dimensional variation within the tolerances has a reduced or even minimal influence of the performance of the functional components as well as the ease of assembling the endoscope handle.

SUMMARY

On this background, it may be seen as an object of the present disclosure to provide an endoscope handle that allows inspecting, testing, and validating the performance of the functional components prior to the complete assembly of the endoscope handle. Another object of the present disclosure is to provide an endoscope handle that can be manufactured to looser tolerances while maintaining the function of one or more of the functional components.

One or more of these objects may be met by aspects of the present disclosure as described in the following.

A first aspect of this disclosure relates to an endoscope handle for an endoscope for visually inspecting inaccessible places, such as human body cavities, the endoscope handle comprising:

a frame extending along a longitudinal axis between a first longitudinal end and a second longitudinal end, a fluid handling device, such as a fluid fitting, being secured to the frame via an interface, the fluid handling device comprising a fluid passage having a first fluid opening and preferably a second fluid opening, a tube, such as a working channel tube, in fluid communication with the fluid opening of the fluid handling device, and a first shell part and a second shell part, the shell parts enclosing a cavity accommodating the frame, the tube, and at least partly the fluid handling device therein, the shell parts forming an exterior surface shaped to form an ergonomic grip for the operator, preferably the fluid passage of the fluid handling device extending through the exterior surface so that the second fluid opening of the fluid handling device is arranged exteriorly of the exterior surface and so that the first fluid opening of the fluid handling device is arranged within the cavity of the shell parts;

wherein, at least prior to enclosing the frame, the tube, and at least partly the fluid handling device within the cavity of the shell parts, the interface and the tube are configured to permit movement of the fluid handling device relative to the frame within a pre-determined boundary comprising a first position and a second position separated by a distance.

By securing the fluid handling device to the frame, the connection between the tube and the fluid handling device may be tested along with other functional components of the handle, e.g. a control device with steering wires prior to being enclosed in a cavity of the shell parts. Further, mounting the components on the frame allows all sides of the frame to be available for inspection and testing. This is in contrast to mounting the components in say one of the shell parts, which would only allow inspection from a single side. Securing the fluid handling device via an interface that allows movement between the fluid handling device and the frame may be advantageous in allowing positional flexibility of the fluid handling device to absorb tolerances. Thus, a loosening of the tolerances of the shell parts and the frame can be implemented without risking that, at extreme ends of the tolerance variation, the fluid handling device cannot be partly enclosed by the shell parts.

Additionally or alternatively, the fluid handling device may be arranged closest to the first longitudinal end of the frame in the first position, and the fluid handling device may be arranged farthest from the first longitudinal end of the frame in the second position.

Since the shell parts is typically elongated to accommodate the frame, translation movement substantially aligned along the longitudinal extent of the frame may be sufficient to absorb the tolerances.

Additionally or alternatively, the distance between the first position and the second position may be at least 0.2, 0.5, 0.8, or even 0.11 mm along the longitudinal axis. Alternatively, the distance between the first and second position along the longitudinal axis may be in the range of 0.2 to 3.0 mm, preferably 0.5 to 2.5 mm, more preferably 0.75 to 2.0 mm.

The inventors have found that providing the interface to allow such movement, advantageously allows the fluid handling device to absorb typical manufacturing tolerances.

Additionally or alternatively, the pre-determined boundary may be a pre-determined path comprising the first position and the second position. The pre-determined path may preferably be arranged along the longitudinal direction.

By providing the pre-determined boundary as a path instead of e.g. an area or volume, the practical implementation may be further simplified.

Additionally or alternatively, the interface may be a prismatic joint. One example may be a pin-joint interface as described in the following but other types of prismatic joints may be applicable, such as various types of slider joints.

Additionally or alternatively, the interface may comprise a slot defining the pre-determined path and a pin secured to the slot, wherein the slot forms part of one of the frame and fluid handling device, and the pin forms part of the other one of the frame and fluid handling device The first position may correspond to a proximal end position of the slot, and the second position may correspond to a distal end position of the slot. Prior to the frame, the fluid handling device, and the tube being enclosed in cavity of the shell parts, the interface parts may be configured to permit translational movement of the pin in the slot between the proximal end position of the slot and the distal end position of the slot.

By arranging the interface as a pin-slot interface, the assembly of the interface is simplified as the assembler simply inserts the pin in the slot.

Additionally or alternatively, the pin may comprise a body, preferably extending along a pin direction, and a head. The body may be accommodated in the slot and may terminate in the head. The head may secure the pin to the slot by preventing removal of the pin, preferably in a transverse direction to the longitudinal direction, such as the pin direction.

Such an arrangement may prevent accidental removal of the pin from the slot, e.g. during assembly or testing and validation.

Additionally or alternatively, the fluid handling device may be a fluid fitting, such as a T- or Y-connector, or a valve.

Additionally or alternatively, the frame may comprise a first tube guide passage accommodating the tube and guiding the tube towards the second longitudinal end of the frame and towards the fluid opening. The fluid handling device may additionally or alternatively comprise a second tube guide passage that may accommodate the tube and may guide the tube from the fluid opening and preferably towards the first tube guide passage.

By providing tube guide passages, the tube can be accommodated and retained within the tube guide passages during assembly.

The tube guide passages may be open, e.g. as open channels, for example with a channel bottom and two opposing channel walls and an open top side providing access to the channel, e.g. to allow the assembler to fit the tube within the tube guide passages through the open top side.

Additionally or alternatively, the shell parts may be interlocked and may accommodate the frame, the tube, and at least partly the fluid handling device within the enclosed cavity of the shell parts. The interlocked shell parts may fix the interface so that the fluid handling device is locked in a position within the pre-determined boundary in the range from the first position to the second position.

Additionally or alternatively, the endoscope handle may further comprise a control device movably secured to the frame so that the control device is movable relative to the frame. The control device may be configured for steering a distal end of the endoscope upon manipulating the control device by an operator.

Implementing such a fluid handling device secured via the interface in an endoscope handle comprising a control device may be advantageous in that the shell parts can be provided to minimise misalignment of the control device, while the fluid handling device is adaptable to the given dimensions of the shell parts.

Additionally or alternatively, the control device may be arranged closer to the first longitudinal end of the frame than the fluid handling device. Preferably, the control device is arranged at the first longitudinal end of the frame and the fluid handling device is arranged at the second longitudinal end of the frame.

By arranging the control device and the fluid handling device at opposite ends, the tolerance chain may become wider towards the location of the fluid handling device, but such an increased tolerance chain may be absorbed during assembly of the endoscope handle by the movability of the fluid handling device relative to the frame.

Additionally or alternatively, the frame may comprise one or more first engagement portions each being interlocked with a corresponding second engagement portion of the shell parts.

Additionally or alternatively, the shell parts may comprise one or more snap lock pairs that each may include a male part of one of the shell parts and a corresponding female part of another one of the shell parts. The male snap lock parts may be snap-locked onto the corresponding female snap lock parts to secure the shell parts to each other so as to fix the one or more first engagement portions of the frame within the corresponding second engagement portions of the shell parts, which may thereby fix the frame relative to the shell parts.

Additionally or alternatively, all the male parts may be arranged on one of the shell parts and all of the female parts may be arranged on the other shell part.

Additionally or alternatively, the one or more snap lock pairs may number at least three, four, five, six, seven, eight, nine or ten.

Additionally or alternatively, a separation line between the first and the second shell part may extend in a single separation plane that may preferably be perpendicular to a pivot axis of the control device.

A second aspect of this disclosure relates to an endoscope for visually inspecting inaccessible places, the endoscope comprising:
- a distal tip part including an image sensor,
- a bending section attached to the distal tip part;
- an insertion tube for insertion into a patient and being attached to the bending section;
- the endoscope handle according to the first aspect of this disclosure, the endoscope handle being attached to the insertion tube opposite of the bending section; and
- at least one steering wire running through the bending section and the insertion tube and preferably attached to a control device of the endoscope handle, so that manipulating the endoscope handle tensions the at least one steering wire and effects bending of the bending section so as to steer the distal end tip of the endoscope.

A third aspect of this disclosure relates to an endoscope system for visually inspecting inaccessible places, such as human body cavities, the endoscope system comprising a monitor, and an endoscope according to the second aspect of this disclosure or an endoscope comprising an endoscope handle according to the first aspect of this disclosure and a distal tip part with an image sensor. The endoscope is connectable to the monitor, and the monitor is configured for displaying an image captured by the image sensor of the endoscope.

A fourth aspect of this disclosure relates to a method of assembling an endoscope handle according to the first aspect of the disclosure. The method comprises the steps of:
- providing:
  - a frame extending along a longitudinal axis between a first longitudinal end and a second longitudinal end,
  - a fluid handling device comprising a fluid passage having a fluid opening,
  - a tube, and
  - a first shell part and a second shell part;
- attaching an end of the tube to the fluid handling device so that the tube is in fluid communication with the fluid opening of the fluid handling device;
- securing the fluid handling device to the frame via an interface, the interface permitting movement of the fluid handling device relative to the frame within a pre-determined boundary comprising a first position and a second position separated by a distance;
- securing the control device to the frame so that the control device is movable relative to the frame;
- arranging the frame with the control device and the fluid handling device in one of the shell parts; and
- closing the first shell part and the second shell part to enclose a cavity accommodating the frame with the control device and at least partly the fluid handling device therein.

Additionally, the step of securing the fluid handling device may comprise arranging the tube in a first tube guide passage of the frame and/or a second tube guide passage of the fluid handling device.

Additionally or alternatively, the step of closing the shell parts may comprise interlocking the shell parts.

Additionally or alternatively, the step of closing the shell parts may comprise fixing the interface so that the fluid handling device is locked in a position within the pre-determined boundary in the range from the first position to the second position.

A person skilled in the art will appreciate that any one or more of the above aspects of this disclosure and embodiments thereof may be combined with any one or more of the other aspects of this disclosure and embodiments thereof.

BRIEF DESCRIPTION OF THE DRAWINGS

Embodiments of this disclosure will be described in more detail in the following with regard to the accompanying figures. The figures show one way of implementing the present invention and are not to be construed as being limiting to other possible embodiments falling within the scope of the attached claim set.

FIG. 3 is schematic exploded view of an endoscope.

FIG. 4b is a side view of the frame of FIG. 4a.

FIG. 5a is a schematic side view of an endoscope handle of the endoscope of FIG. 3 shown wherein the second shell part is omitted to show the interior of the endoscope handle.

FIG. 5b is a cross-sectional view of the endoscope handle along line AU-AU shown in FIG. 5a.

FIG. 5c is a cross-sectional view of a snap lock connection of the shell parts along line AV-AV shown in FIG. 5a.

FIG. 5d is a detail view of the connection between the shell parts and the control device as indicated by the dashed circle B shown in FIG. 5b.

FIG. 7b is a cross-sectional view of the connection between the fluid handling device and the tube along line BJ-BJ shown in FIG. 5a.

DETAILED DESCRIPTION

In the following figure description, the same reference numbers refer to the same elements and may thus not be described in relation to all figures. Further, a prime symbol is suffixed for each ordinal element, i.e. a first element is denoted without a prime symbol, a second element of the same type is denoted with a single prime symbol, and a third element of the same type is denoted with two prime symbols and so on.

Figure 1:
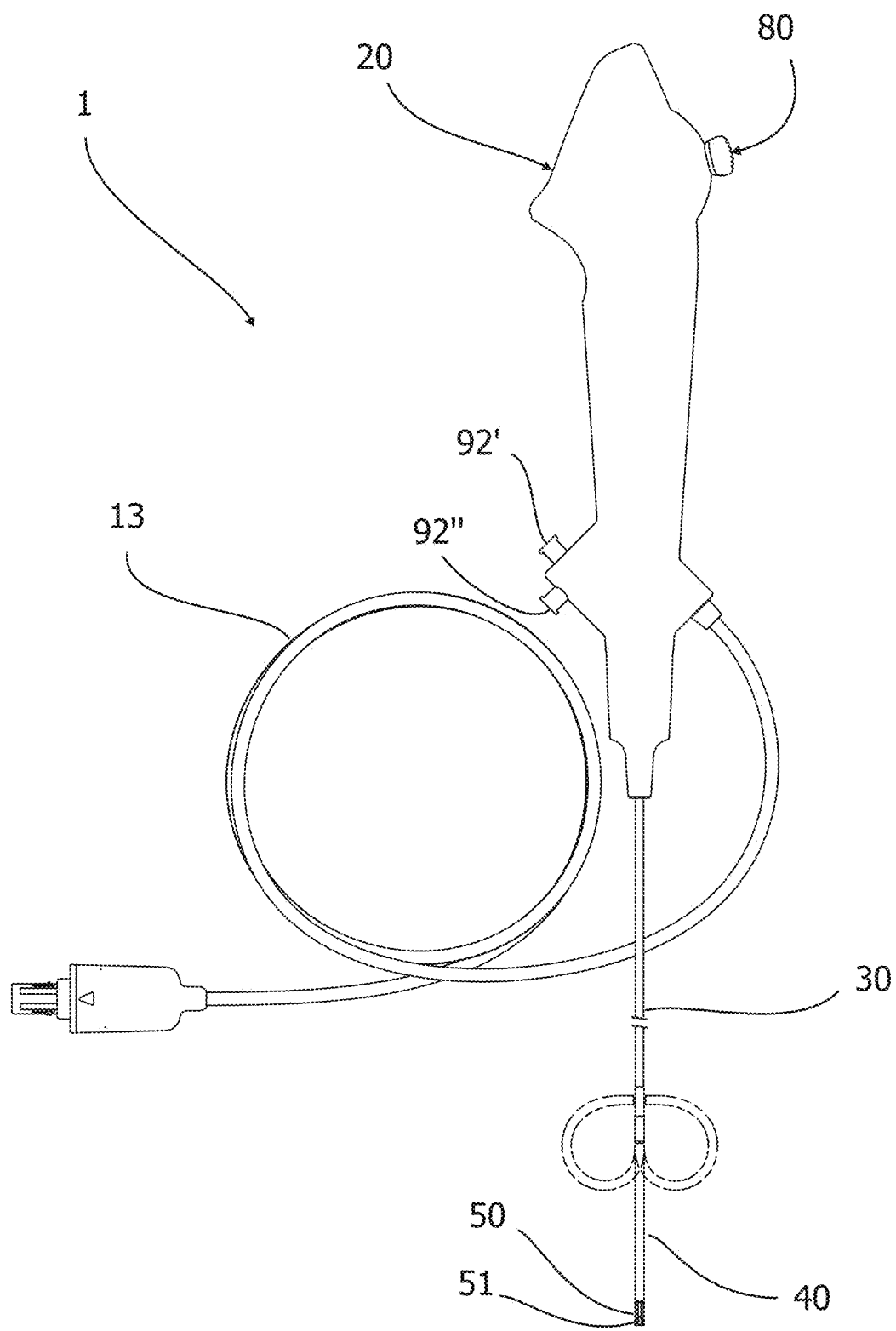
FIG. 1 is a schematics side view of an endoscope illustrating bending of a distal end of the endoscope.

FIG. 1 illustrates an endoscope 1, which is disposable and not intended to be cleaned and reused. The endoscope 1 comprises a distal tip part 50, a handle 20 for gripping with a control device 80, an insertion tube 30 for insertion into a patient, and a bending section 40. The bending section 40 comprises articulated segments connected by living hinge members as shown in FIG. 3 and is typically formed in one piece by injection moulding. The bending section 40 is connected between the distal tip part 50 housing a vision device 51 and the insertion tube 30. The insertion tube 30 extends between the handle 20 and the bending section 40. The insertion tube 30 has an exterior tubular surface facing the surroundings of the endoscope 1. The distal tip part 50 includes an image sensor (not shown) positioned in an interior cavity (not shown) of the distal tip part 50.

Figure 2:
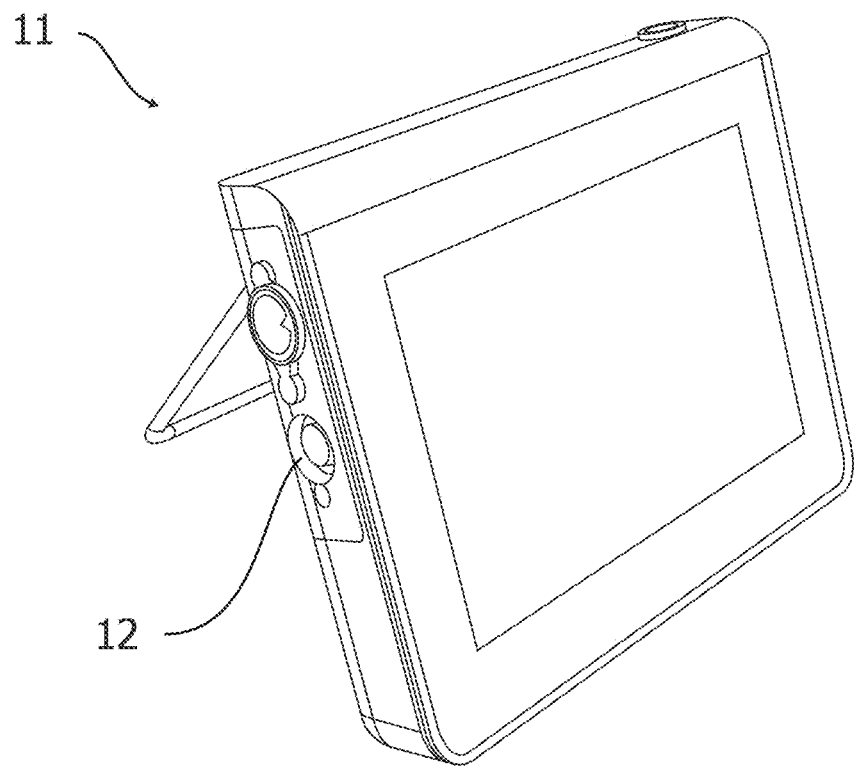
FIG. 2 is a schematic perspective view of a monitor for connecting to the endoscope of FIG. 1.

In FIG. 2, a monitor 11 is shown. The monitor 11 comprises a cable socket 12 to which a monitor cable 13 of the endoscope 1 (shown in FIG. 1) can be connected to establish signal communication between the image sensor of the distal tip part 50 and the monitor 11. The monitor 11 display images and/or video captured by the image sensor of the endoscope 1 thus allowing an operator to "see" the body cavity through the image sensor of the endoscope 1.

Turning to FIG. 3, the components of the endoscope 1 is shown in greater detail in an exploded view. The endoscope handle 20 comprises a first shell part 60, a second shell part 60', a frame 70, and the control device 80. Two steering wires 22, 22' each extend from the control device 80 through a respective wire tube 23, 23' running through the insertion tube 30 and the bending section 40. In one variation, the steering wires 22, 22' are portions of a single wire and are connected to each other by an intermediate portion, or wire loop (not shown), located between the bending section 40 and the distal tip part 50. In another variation, the steering wires 22, 22' are separate wires, each having a distal portion connected to the bending section 40 and/or the distal tip part 50 and a portion accommodated in the wire tube. A working channel extends inside a working channel tube 34 that runs along the inside of the insertion tube 30 and the bending section 40 from fluid openings 92', 92" of a fluid handling device 90 to a distal opening (not shown) in the distal tip part 50. The working channel allows liquid or air to be added to and/or removed from the body cavity or allows for insertion of medical tools or surgical instruments into the body cavity.

Figure 4A:
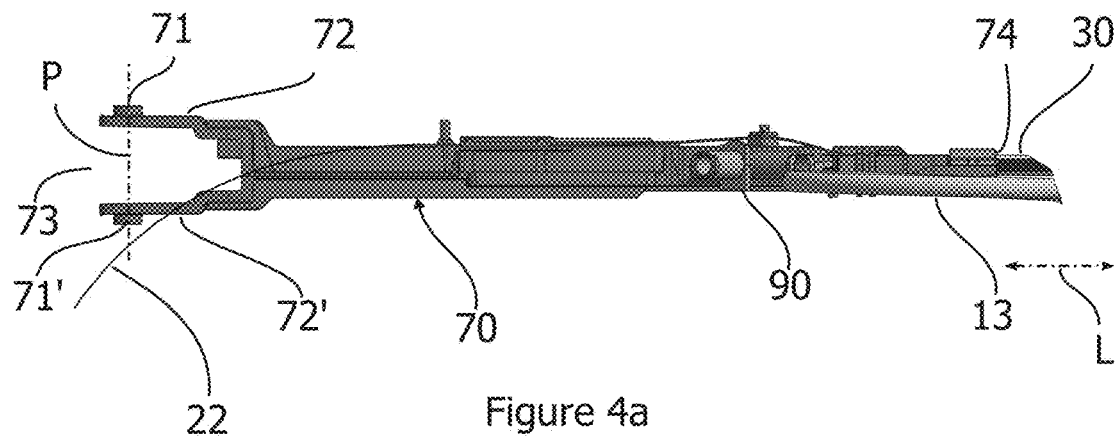
FIG. 4a is a top view of a frame of an endoscope handle of the endoscope of FIG. 3.
Figure 4B:
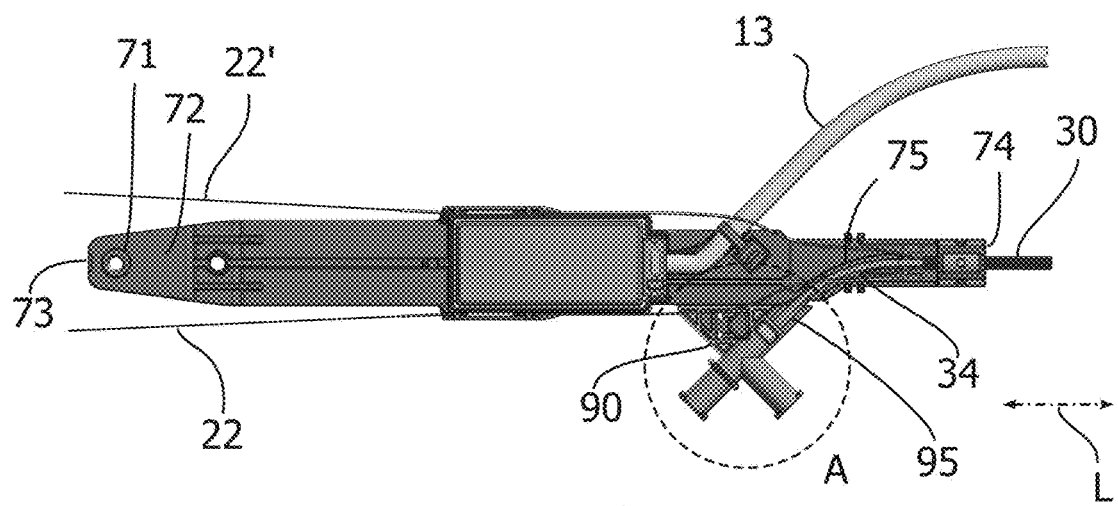
Figure 4C:
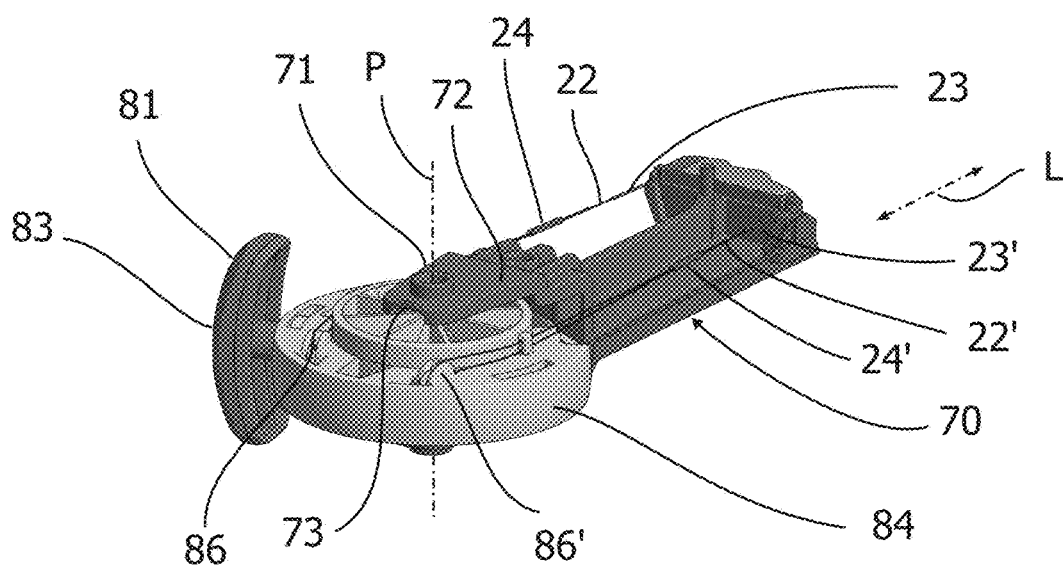
FIG. 4c is a schematic perspective view of the frame of FIGS. 4a and 4b with a mounted control device and steering wires.

Turning to FIGS. 4a-4c, the details of the frame 70, the control device 80, and the fluid handling device 90 are shown.

As best seen in FIGS. 4a-4b, the frame 70 extends along a longitudinal axis L between a proximal longitudinal end 73 and a second longitudinal end 74. The frame 70 comprises a first bearing 71, as shown in FIGS. 4a-4c, and a second bearing 71', as shown in FIG. 4a. The frame 70 and the bearings 71, 71' are formed in a single piece of a polymer material, preferably by injection moulding.

As best seen in FIG. 4c, the control device 80 is arranged at the proximal longitudinal end 73 of the frame and comprises a cylindrical body 84 with trunnions 85, 85' (visible in FIG. 5b and in particular in FIG. 5d), and a control lever 81. The trunnions 85, 85' extend from opposite sides of the body 84 along a pivot axis P. The control lever 81 has an exterior friction-inducing surface 83 for securely engaging with a finger of an operator so as to allow the operator to pivot the control device 80 about the pivot axis P.

As seen in FIG. 4c, the ends of the two steering wires 22, 22' are guided around respective wire loop portions 86, 86' of the body 84 and crimped onto the same steering wire 22, 22' via crimps 24, 24' so as to fix the steering wires 22, 22' to the control device. Since the steering wires run inside wire tubes 23, 23' which are fixed, the control device 80 can thus steer the distal tip part 50 of the endoscope when an operator manipulates the friction-inducing surface 83 of the control lever 81 to pivot the control device 80 about the pivot axis P and thus tension one of the steering wires 22, 22'. This principle may be known as a Bowden cable.

The steering wires 22, 22', the working channel tube 34, the cable 53 run along the inside of the insertion tube 30 which terminates at its proximal end in an end cap 27. The end cap 27 is arranged about the distal longitudinal end 74 of the frame 70.

The frame further comprises a first arm 72 having the first bearing 71, and a second arm 72' having the second bearing 71'. The arms 72, 72' extend substantially in parallel. The arms 72, 72' comprises respective ramps 77, 77' oriented along the longitudinal axis L and leading to the bearings 71, 71' as best seen in FIG. 5d. Further, the arms 72, 72' are configured, when inserting the trunnions 85, 85' in the ramps 77, 77', to flex away from each other to allow insertion of the trunnions 85, 85' in the bearings 71, 71', and to return to a resting position once the trunnions 85, 85' of the control device 80 are arranged in bearings 71, 71' so as to securely hold the trunnions 85, 85' in the bearings 71, 71', and accordingly mount the control device 80 to the frame 70.

The first shell part 60 comprise a first column 61, see FIGS. 3, 5b, and 5d. The second shell part 60' comprises a second column 61', see FIGS. 5b and 5d. Turning specifically to FIG. 5d, the columns 61, 61' extend along a respective column axis C, C' and into the cavity 63 from opposite sides.

The first shell part 60 comprises three first alignment parts 64a, 64a', 64a", as best seen in FIG. 5a, forming three alignment pairs together with three corresponding second alignment parts (not shown) of the second shell part 60'. The alignment pairs are configured, upon closure of the shell parts, to align the column axes C, C' with respect to each other, and thus the alignment pairs are arranged substantially along the separation line 67 of the shell parts 60, 60' and circumscribe the body 84 of the control device 80, as indicated by the first alignment parts 64a, 64a', 64a" in FIG. 5a.

Figure 6A:
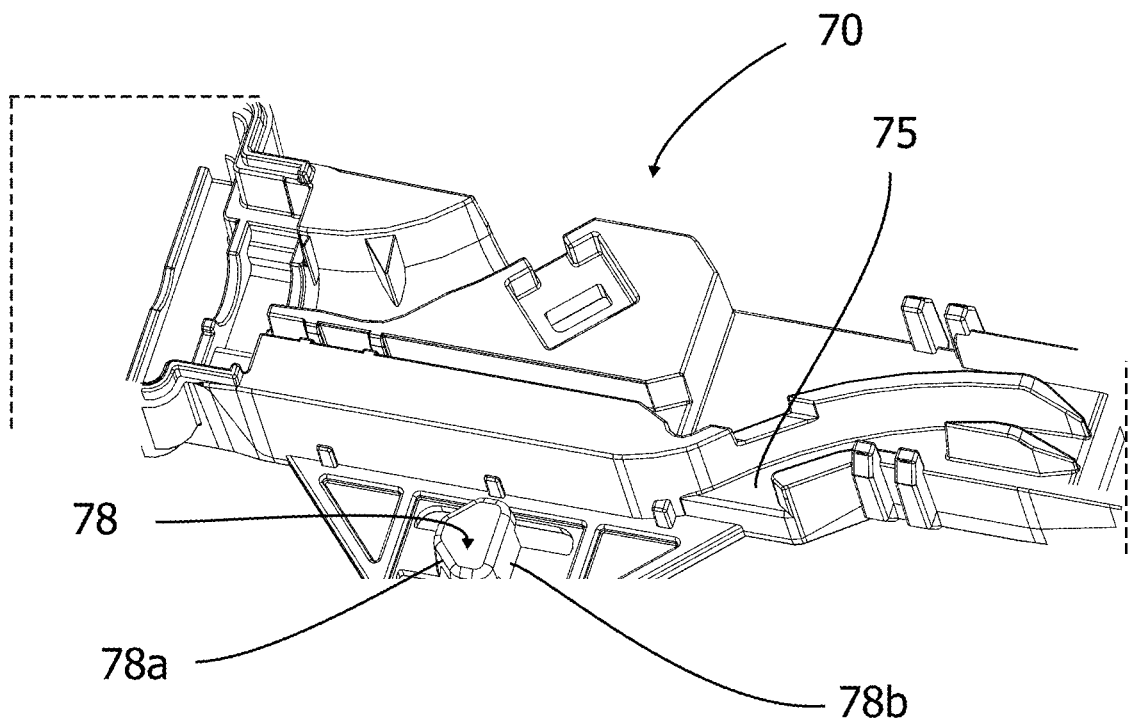
FIG. 6a is a detail view at the location of the pin of the frame.
Figure 6B:
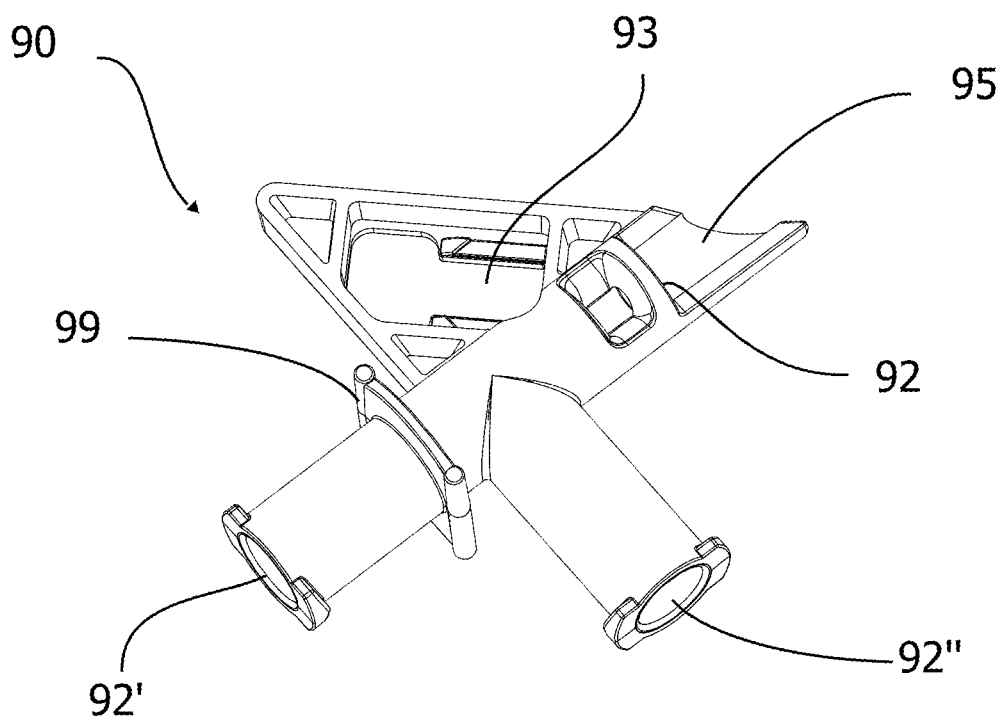
FIG. 6b is a perspective view of the fluid handling device.
Figure 7A:
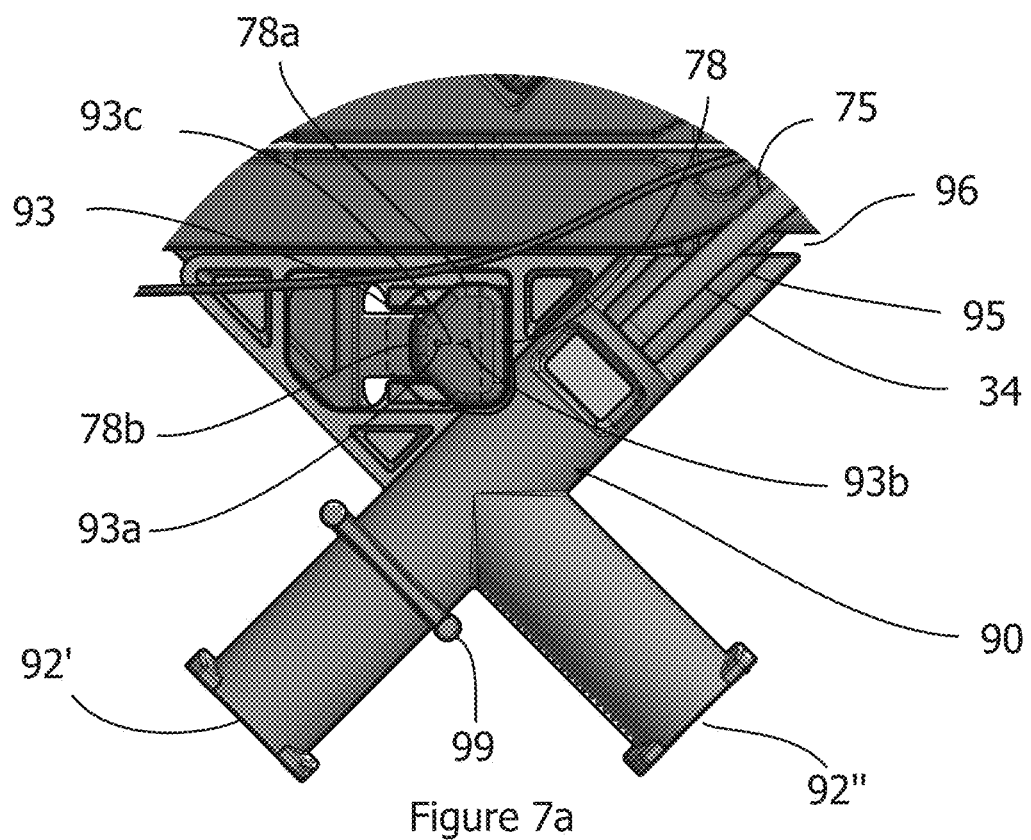
FIG. 7a is a detail view of connection between the fluid handling device and the frame as indicated by the dashed circle A shown in FIG. 4b.
Figure 7B:
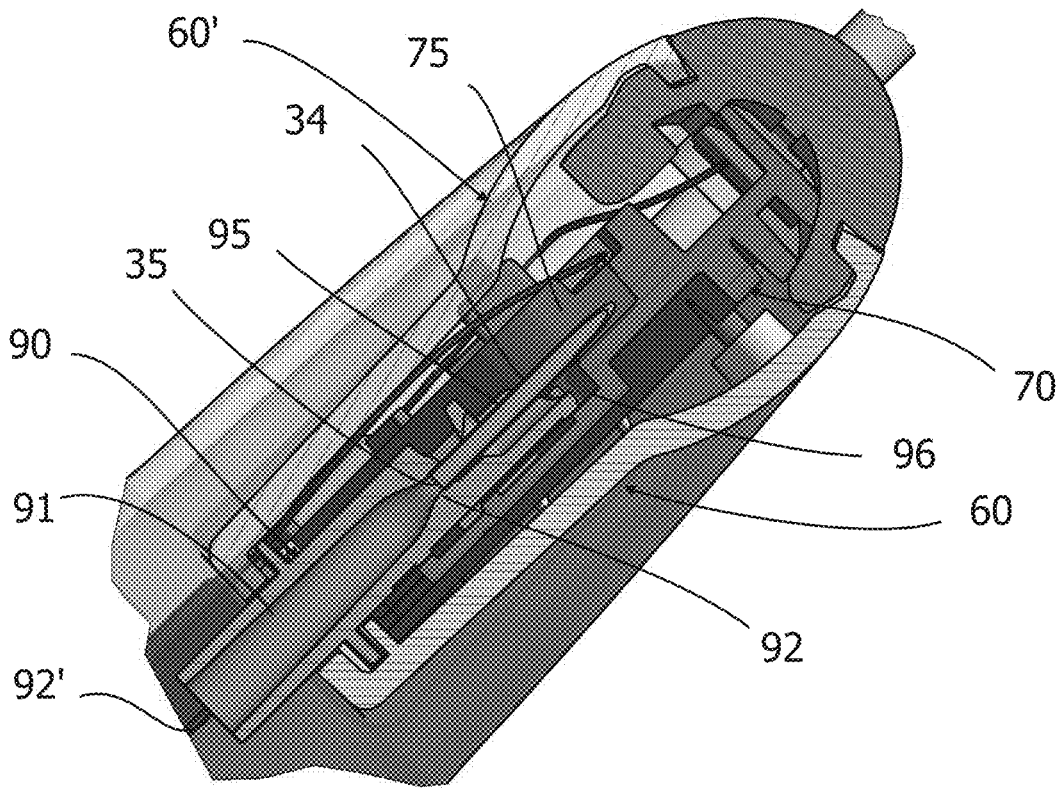

The endoscope handle 20 further comprises a fluid handling device 90 in the form of a T-connector fluid fitting, as best seen in FIGS. 4b, 6b and 7a, which is formed separately from the frame 70. The fluid handling device is arranged substantially at the distal longitudinal end 74 of the frame 70. In other words, the control device 80 and the fluid handling device 90 are arranged at opposite longitudinal ends of the frame 70. As best seen in FIG. 7b, the fluid handling device comprises a fluid passage 91 having a first fluid opening 92 and further a second fluid opening 92', and a third fluid opening 92" as shown in FIGS. 6b and 7a. a proximal opening 35 of the working channel tube 34 is arranged in the first fluid opening 92 and is in fluid communication with the second fluid opening 92' and the third fluid opening 92".

The fluid handling device 90 is securely mounted onto the frame 70 via an interface in the form of a prismatic joint comprising a slot 93 and a pin 78 secured to the slot 93. In this embodiment, the slot 93 forms part of the fluid handling device 90 as shown in FIG. 6b and the pin 78 forms part of the frame 70 as shown in FIG. 6a but may in other embodiments be vice versa.

The pin 78 comprises a body 78b extending along a pin direction (through the plane of FIG. 7a) and a head 78a. As best seen in FIG. 6a, the body 78b is accommodated in the slot 93 and terminates in the head 78a, which secures the pin 78 to the slot 93 by preventing removal of the pin along the pin direction.

The slot 93 defines a pre-determined path extending along the longitudinal axis L between a proximal end position 93a of the slot 93, which is closest to the proximal longitudinal end 73 of the frame 70, and a distal end position 93b of the slot 93, which is farthest from the proximal longitudinal end 73 of the frame 70.

In the arrangement shown in FIGS. 4a-4b, i.e. prior to assembly with the shell parts 60, 60', the interface permits translational movement of the pin 78 in the slot 93 between the proximal end position 93a of the slot 93 and the distal end position 93b of the slot 93. The distance between the proximal end position 93a and the distal end position 93b is in the range of 0.2 mm to 2.5 mm, preferably around 1.25 mm, as this has been found to allow movement to absorb typical dimensional variation. However, the distance may be even less or more in some embodiments. Further, the working channel tube 34 is arranged with enough slack to allow movement of the fluid handling device 90 relative to the frame 70 via the interface.

As best seen in FIGS. 4b, 7a, and 7b, the frame 70 comprises a first tube guide passage 75 accommodating the working channel tube 34 and guiding the tube 34 towards the second longitudinal end 74 of the frame 70 (see FIG. 4b) and towards the first fluid opening 92 (see FIG. 7b). The fluid handling device 90 comprises a second tube guide passage 95 that accommodates the tube 34 and guides the tube 34 from the first fluid opening 92 and towards the first tube guide passage 75. The first tube guide passage 75 and the second tube guide passage 95 are separated by a gap 96, as best seen in FIGS. 7a-7b. The tube guide passages 75, 95 are formed as open channels having a channel bottom and two opposing channel walls and an open top side providing access to the channel. This allows the assembler to fit the tube 34 within the tube guide passages 75, 95 through the open top side.

The frame comprises two first engagement portions 76, 76' interlocking with two corresponding second engagement portions 66, 66' of the shell parts 60, 60', as best seen in FIG. 5b. The bearings 71, 71' also function as two further first engagement portions, and the collars 62, 62' also function as two further corresponding second engagement portions. The corresponding first and second engagement portions are configured, upon closure of the shell parts 60, 60', to engage and fix the frame 70 within the shell parts 60, 60'.

The shell parts 60, 61' comprise nine snap lock pairs. Each pair includes a male part 65a of one of the shell parts 60, 60' and a corresponding female part 65b of another one of the shell parts 60, 60'. The snap lock pairs are configured to be engaged upon closure of the shell parts 60, 60' to fix the shell parts to each other.

The endoscope handle 20 can be assembled as follows. The frame 70 including the mounted control device 80, fluid handling device 90, and end cap 27 is arranged in one of the shell parts 60, 60' and the other shell part is placed over to close the shell parts 60, 60'. During the closure, the columns 61, 61' are arranged in the bearings 71, 71' of the frame 70 abutting the trunnions 85, 85' while allowing the control device 80 to pivot around the pivot axis P. The bearings 71, 71' of the frame 70 are arranged in collars 62, 62' so that the collars 62, 62' retain the bearings 71, 71'.

Furthermore, the alignment pairs are engaged so as to align the columns 61, 61' with respect to each other. In other words, the column axes C, C' are aligned towards coinciding. The corresponding first and second engagement portions engage and fix the frame 70 within the shell parts 60, 60'. A flange 99 of the fluid handling device 90 is arranged in a slit 69 of the first shell part 60', which fixes the fluid handling device 90 relative to the frame 70 (which are fixed via the engagement portions) so that the fluid handling device 90 is locked in a position within the pre-determined path in the range from the proximal end position 93a to the distal end position 93b. Accordingly, the fluid handling device 90 is adjusted to absorb tolerances of the frame 70 and shell parts 60, 60'.

Lastly, the male snap lock parts 65a are snap-locked onto the corresponding female snap lock parts 65b to secure the shell parts 60, 60' to each other so as to clamp the trunnions 85, 85' of the control device 80 between the columns 61, 61' of the shell parts 60, 60'. Accordingly, the trunnions 85, 85' are retained between the columns 61, 61'. Since the clamping force experienced by the trunnions 85, 85' substantially coincides with the pivot axis P, as seen in FIG. 5d, the pivoting of the control device about the pivot axis P is largely unaffected. The trunnions 85, 85' and the columns 61, 61' are supported by the bearings 71, 71' of the frame 70 so that the control device 80 is rotatable about the pivot axis P. Each trunnion 85, 85' extends partly through the respective bearing 71, 71' and mates with the respective column 61, 61' within the respective bearing 71, 71'. The first shell part 60 comprises a first collar 62, and the second shell part 60' comprises a second collar 62'. The collars 62, 62' each surround the respective column 61, 61' and retains the respective bearings 71, 71' of the frame 70, as best seen in FIG. 5d.

Once closed, the shell parts 60, 60' form an exterior surface 68 shaped to form an ergonomic grip for the operator. The exterior surface 68 is divided by a separation line 67 (as seen in FIGS. 5b and 5d) that extends in a single plane, which is perpendicular to the column axes C, C', as best seen in FIG. 5d. The separation line 67 defines the border between the shell parts 60, 60'. The shell parts 60, 60' enclose a cavity 63, which accommodates the frame 70 and the body 84 of the control device 80, while the control lever 81 extends radially relative to the pivot axis P through a first cut-out 68a of the exterior surface 68 of the shell parts 60, 60', as shown in FIGS. 3 and 5a.

Further, the fluid passage 91 of the fluid handling device 90 extends through the exterior surface 68. The second fluid opening 92' and the third fluid opening 92" of the fluid handling device 90 are arranged exteriorly of the exterior surface 68 and thus accessible for the operator. The first fluid opening 92 of the fluid handling device 90 is arranged within the cavity 63 and the fluid connection between the first fluid opening 92, and the working channel tube 34 is protected by the shell parts 60, 60'.

The following items are further variations and examples of the embodiments described above:

1. An endoscope handle (20) for an endoscope for visually inspecting inaccessible places, such as human body cavities, the endoscope handle comprising: a frame (70) extending along a longitudinal axis (L) between a first longitudinal end (73) and a second longitudinal end (74), a fluid handling device (90) being secured to the frame via an interface (93, 78), the fluid handling device comprising a fluid passage (91) having a first fluid opening (92), a tube (34) in fluid communication with the fluid opening of the fluid handling device, and a first shell part (60) and a second shell part (60'), the shell parts enclosing a cavity (63) accommodating the frame, the tube, and at least partly the fluid handling device therein, the shell parts forming an exterior surface (68) shaped to form an ergonomic grip for the operator; wherein at least prior to enclosing the frame, the tube, and at least partly the fluid handling device within the cavity of the shell parts, the interface and the tube are configured to permit movement of the fluid handling device relative to the frame within a pre-determined boundary comprising a first position (93a) and a second position (93b) separated by a distance (93c).

2. An endoscope handle according to item 1, wherein the fluid handling device is arranged closest to the first longitudinal end of the frame in the first position, and the fluid handling device is arranged farthest from the first longitudinal end of the frame in the second position.

3. An endoscope handle according to any one of the previous items, wherein the distance between the first position and the second position is at least 0.2 mm along the longitudinal axis.

4. An endoscope handle according to any one of the previous items, wherein the pre-determined boundary is a pre-determined path comprising the first position and the second position, the pre-determined path preferably being arranged along the longitudinal direction.

5. An endoscope handle according to item 3, wherein the interface comprises a slot (93) defining the pre-determined path and a pin (78) secured to the slot, wherein the slot forms part of one of the frame and fluid handling device, and the pin forms part of the other one of the frame and fluid handling device, wherein the first position corresponds to a proximal end position of the slot and the second position corresponds to a distal end position of the slot, prior to the frame, the fluid handling device, and the tube being enclosed in the cavity of the shell parts, the interface being configured to permit translational movement of the pin in the slot between the proximal end position of the slot and the distal end position of the slot.

6. An endoscope handle according to item 4, wherein the pin comprises a body (78b) and a head (78a), the body being accommodated in the slot and terminating in the head, wherein the head secures the pin to the slot by preventing removal of the pin, preferably in a transverse direction to the longitudinal direction.

7. An endoscope handle according to any one of the previous items, wherein the fluid handling device is a fluid fitting, such as a T or Y connector, or a valve.

8. An endoscope handle according to any one of the previous items, wherein the frame comprises a first tube guide passage (75) accommodating the tube and guiding the tube towards the second longitudinal end of the frame and towards the fluid opening, and/or wherein the fluid handling device comprises a second tube guide passage (95) accommodating the tube and guiding the tube from the fluid opening and preferably towards the first tube guide passage.

9. An endoscope handle according to any one of the previous items, wherein the shell parts are interlocked and accommodate the frame, the tube, and at least partly the fluid handling device within the enclosed cavity, wherein the interlocked shell parts fix the interface so that the fluid handling device is locked in a position within the pre-determined boundary preferably in the range from the first position to the second position.

10. An endoscope handle according to any one of the previous items, further comprising a control device (80) movably secured to the frame so that the control device is movable relative to the frame, the control device being configured for steering a distal end (50) of the endoscope upon manipulating the control device by an operator.

11. An endoscope handle according to item 10, wherein the control device is arranged closer to the first longitudinal end than the fluid handling device.

12. An endoscope handle according to any one of the previous items, wherein the frame comprises one or more first engagement portions (76) each being interlocked with a corresponding second engagement portion (66) of the shell parts.

13. An endoscope (1) for visually inspecting inaccessible places, the endoscope comprising: a distal tip part (50) including a vision device, a bending section (40) attached to the distal tip part; an insertion tube (30) for insertion into a patient and being attached to the bending section; an endoscope handle according to any one of the previous items, the endoscope handle being attached to the insertion tube opposite of the bending section; and at least one steering wire (22) attached to the control device of the endoscope handle and running through the bending section and the insertion tube so that manipulating the control device tensions the at least one steering wire (22) and effects bending of the bending section (40) so as to steer the distal end tip of the endoscope.

14. An endoscope system (1, 11) for visually inspecting inaccessible places, such as human body cavities, the endoscope system comprising: a monitor (11); and an endoscope (1) according to item 13, or an endoscope (1) comprising an endoscope handle (20) according to any one of items 1-12 and a distal tip part (50) with an image sensor (54); wherein the endoscope is connectable to the monitor, and the monitor is configured for displaying an image captured by the image sensor of the endoscope.

15. A method of assembling an endoscope handle (20) according to any one of the items 1-12, comprising the steps of: providing a frame (70) extending along a longitudinal axis (L) between a first longitudinal end (73) and a second longitudinal end (74), providing a fluid handling device (90) comprising a fluid passage (91) having a fluid opening (92), providing a tube (34), and providing a first shell part (60) and a second shell part (60'); attaching an end of the tube to the fluid handling device so that the tube is in fluid communication with the fluid opening of the fluid handling device; securing the fluid handling device to the frame via an interface, the interface permitting movement of the fluid handling device relative to the frame within a pre-determined boundary comprising a first position and a second position separated by a distance; securing the control device to the frame so that the control device is movable relative to the frame; arranging the frame with the control device and the fluid handling device in one of the shell parts; and closing the first shell part and the second shell part to enclose a cavity (63) accommodating the frame with the control device and at least partly the fluid handling device therein.

LIST OF REFERENCES 1 endoscope
11 monitor
12 cable socket
13 monitor cable
20 handle
22 steering wire
23 wire tube
24 wire crimp
27 end cap
30 insertion tube
31 proximal end
32 distal end
34 working channel tube
35 proximal opening
40 bending section
50 distal tip part
53 data cable 60 shell part
61 column
62 collar
63 cavity
64a first alignment part
64b second alignment part
65a male snap lock part
65b female snap lock part
66 second engagement portion
67 separation line
68 exterior surface
68a cut out
69 slit
70 frame
71 bearing
72 arm
73 proximal longitudinal end
74 distal longitudinal end
75 first tube guide passage
76 first engagement portion
77 ramp
78 pin
78a pin head
78b pin body
80 control device
81 control lever
83 friction-inducing surface
84 body
85 trunnion
86 wire loop portion
90 fluid handling device
91 fluid passage
92 fluid opening
93 slot
93a proximal end position
93b distal end position
93c distance
95 second tube guide passage
96 gap
99 flange
P pivot axis
C column axis
L longitudinal axis

We claim:

1. An endoscope comprising:
a handle including:
an interface comprising an elongate slot and a pin, the elongate slot having a longitudinal axis and the pin being configured to translate in the elongate slot,
a frame comprising the elongate slot or the pin,
a fluid handling device being secured to the frame via the interface, the fluid handling device comprising a fluid passage having a first fluid opening, a second fluid opening and a third fluid opening, the fluid handling device further comprising the other of the elongate slot or the pin,
a tube in fluid communication with the first fluid opening of the fluid handling device, and
shell parts comprising a first shell part and a second shell part, the shell parts secured to each other to enclose in between them the frame, a proximal end of the tube, and at least partly the fluid handling device, the shell parts forming an exterior surface of the handle;
wherein at least prior to the shell parts being secured to each other, the interface is configured to permit translation of the fluid handling device relative to the frame along the longitudinal axis within a pre-determined boundary comprising a first position and a second position separated by a distance.

2. The endoscope of claim 1, wherein the frame comprises a first longitudinal end and a second longitudinal end, wherein the fluid handling device is arranged closest to the first longitudinal end of the frame in the first position, and wherein the fluid handling device is arranged farthest from the first longitudinal end of the frame in the second position.

3. The endoscope of claim 1, wherein the distance between the first position and the second position is at least 0.2 mm along the longitudinal axis.

4. The endoscope of claim 1, wherein the pre-determined boundary is a pre-determined path comprising the first position and the second position.

5. The endoscope of claim 4, wherein the longitudinal axis defines a longitudinal direction, and wherein the pre-determined boundary is arranged along the longitudinal direction.

6. The endoscope of claim 4, wherein the slot defines the pre-determined path, wherein the first position corresponds to a proximal end position of the slot and the second position corresponds to a distal end position of the slot, the interface being configured, at least prior to the shell parts being secured to each other, to permit translational movement of the pin in the slot between the proximal end position of the slot and the distal end position of the slot.

7. The endoscope of claim 6, wherein the pin comprises a body and a head, the body being accommodated in the slot and terminating in the head, and wherein the head secures the pin to the slot by preventing removal of the pin.

8. The endoscope of claim 7, wherein the head secures the pin to the slot by preventing removal of the pin in a direction transverse to the longitudinal axis.

9. The endoscope of claim 4, wherein the shell parts are interlocked and fix the interface so that the fluid handling device is locked in a position within the pre-determined boundary.

10. The endoscope of claim 1, wherein the fluid handling device is a fluid fitting.

11. The endoscope of claim 10, wherein the fluid fitting comprises one of a T-connector or a Y-connector or a valve.

12. The endoscope of claim 1, wherein the frame comprises a first tube guide passage accommodating the tube and guiding the tube towards the second longitudinal end of the frame and towards the fluid opening, and/or wherein the fluid handling device comprises a second tube guide passage accommodating the tube and guiding the tube from the fluid opening.

13. The endoscope of claim 1, wherein the frame comprises a first tube guide passage accommodating the tube and guiding the tube towards the second longitudinal end of the frame and towards the fluid opening, wherein the fluid handling device comprises a second tube guide passage accommodating the tube and guiding the tube from the fluid opening, and wherein the second tube guide passage guides the tube from the fluid opening towards the first tube guide passage.

14. The endoscope of claim 1, wherein the frame comprises one or more first engagement portions, each one or more first engagement portions being interlocked with a corresponding second engagement portion of the shell parts.

15. The endoscope of claim 1, further comprising a control device movably secured to the frame so that the control device is movable relative to the frame, the control device being configured to steer a distal end of the endoscope upon manipulating the control device by an operator.

16. The endoscope of claim 15, wherein the control device is positioned proximally of the fluid handling device.

17. The endoscope of claim 15, further comprising:
a distal tip part including a vision device,
a bending section attached to the distal tip part;
an insertion tube for insertion into a patient and being attached to the bending section and to the handle opposite of the bending section; and
at least one steering wire attached to the control device and running through the bending section and the insertion tube so that manipulating the control device tensions the at least one steering wire and bends the bending section.

18. An endoscope system comprising:
a monitor; and
an endoscope according to claim 1, the endoscope further comprising a vision device located at a distal end of the endoscope,
wherein the endoscope is connectable to the monitor, and
wherein the monitor is configured to display an image captured by the vision device.

19. A method of assembling the endoscope of claim 1, the method comprising:
providing the frame;
providing the fluid handling device;
providing the first shell part and the second shell part;
providing the tube;
attaching an end of the tube to the fluid handling device so that the tube is in fluid communication with the fluid opening of the fluid handling device;
securing the fluid handling device to the frame via the interface, the interface permitting movement of the fluid handling device relative to the frame within the pre-determined boundary;
securing a control device to the frame so that the control device is movable relative to the frame;
arranging the frame with the control device and the fluid handling device in the first shell part or the second shell part; and
attaching the first shell part and the second shell part to enclose the cavity accommodating the frame with the control device and at least partly the fluid handling device therein.

20. The endoscope of claim 1, wherein the pre-determined boundary is a pre-determined path comprising the first position and the second position, the pre-determined path being arranged along the longitudinal axis, wherein the elongate slot defines the pre-determined path, wherein the first position corresponds to a proximal end position of the slot and the second position corresponds to a distal end position of the slot.

* * * * *